(12) United States Patent
Lentz et al.

(10) Patent No.: US 12,180,566 B2
(45) Date of Patent: Dec. 31, 2024

(54) BATTERY CELL HOUSING MADE OF AN ALUMINIUM ALLOY STRIP HAVING A HIGH RECYCLING CONTENT

(71) Applicants: Martin Christoph Lentz, Bonn (DE); Andreas Siemen, Jüchen (DE); Holger Aretz, Spessart (DE); Hartmut Janssen, Hilden (DE); Volker Denkmann, Kempen (DE); Mathis Ruppert, Bonn (DE); Thiemo Brüggemann, Aachen (DE); Waldemar Krieger, Düsseldorf (DE); Philipp Kramer, Bornheim (DE)

(72) Inventors: Martin Christoph Lentz, Bonn (DE); Andreas Siemen, Jüchen (DE); Holger Aretz, Spessart (DE); Hartmut Janssen, Hilden (DE); Volker Denkmann, Kempen (DE); Mathis Ruppert, Bonn (DE); Thiemo Brüggemann, Aachen (DE); Waldemar Krieger, Düsseldorf (DE); Philipp Kramer, Bornheim (DE)

(73) Assignee: Speira GmbH, Grevenbroich (DE)

( * ) Notice: Subject to any disclaimer, the term of this patent is extended or adjusted under 35 U.S.C. 154(b) by 0 days.

(21) Appl. No.: 18/621,524

(22) Filed: Mar. 29, 2024

(65) Prior Publication Data
US 2024/0240290 A1    Jul. 18, 2024

Related U.S. Application Data

(63) Continuation of application No. PCT/EP2022/077702, filed on Oct. 5, 2022.

(30) Foreign Application Priority Data

Oct. 5, 2021  (EP) .................................. 21201041

(51) Int. Cl.
| | |
|---|---|
| *H01M 50/11* | (2021.01) |
| *C22C 21/08* | (2006.01) |
| *C22F 1/047* | (2006.01) |
| *H01M 50/119* | (2021.01) |

(52) U.S. Cl.
CPC .............. *C22C 21/08* (2013.01); *C22F 1/047* (2013.01); *H01M 50/119* (2021.01)

(58) Field of Classification Search
CPC ............. H01M 50/119; H01M 50/131; H01M 50/124; H01M 50/138; H01M 50/14; H01M 50/145; C22C 21/08; C22F 1/047
See application file for complete search history.

(56) References Cited

U.S. PATENT DOCUMENTS

| | | | |
|---|---|---|---|
| 8,945,764 B2 * | 2/2015 | Ahn ..................... | H01M 50/133 |
| | | | 429/185 |
| 11,038,227 B2 * | 6/2021 | Hyung ................ | H01M 50/128 |
| 2006/0093908 A1 | 5/2006 | Hwang et al. | |
| 2020/0091483 A1 * | 3/2020 | Tamaki ............... | H01M 50/342 |

FOREIGN PATENT DOCUMENTS

| | | |
|---|---|---|
| JP | H08329908 A | 12/1996 |
| JP | 2001131666 A | 5/2001 |
| JP | 2002157978 A | 5/2002 |
| JP | 2007305597 A | 11/2007 |
| JP | 2009019223 A | 1/2009 |
| JP | 2013087304 A | 5/2013 |
| JP | 2013097900 A | 5/2013 |
| JP | 2015125886 A | 7/2015 |
| JP | 2020527653 A | 9/2020 |
| KR | 20050093467 A | 9/2005 |
| KR | 20160056731 A | 5/2016 |

OTHER PUBLICATIONS

International Alloy Designations and Chemical Composition Limits for Wrought Aluminum and Wrought Aluminum Alloys With Support for On-line Access From: Aluminum Extruders Council Aluminium Federation of South Africa Australian Aluminium Council Ltd. European Aluminium Association Japan Aluminium Association; https://www.aluminum.org/sites/default/files/2021-11/TealSheet.pdf; found on Aug. 22, 2014.

* cited by examiner

*Primary Examiner* — Raymond Alejandro
(74) *Attorney, Agent, or Firm* — Reinhart Boerner Van Deuren P.C.

(57) ABSTRACT

A battery cell housing having an aluminium alloy strip or sheet. The object of providing a battery cell housing having an aluminium alloy strip or sheet which, on the one hand, makes it possible to achieve recycling rates and, on the other hand, satisfies the requirements of a battery cell housing, in particular with regard to strength, electrolyte stability and electrical and thermal conductivity, is achieved in that the aluminium alloy strip or sheet has an aluminium alloy with the following alloy constituents in wt %:

0.1%≤Si≤0.5%,
0.25%≤Fe≤0.8%,
Cu≤0.6%,
0.6%≤Mn≤1.4%,
0.5%≤Fe≤1.5%,
Cr≤0.25%,
Zn≤0.4%,
0.005%≤Ti≤0.2%, the remainder being Al and unavoidable impurities, individually at most 0.05% and in total at most 0.15%.

17 Claims, 2 Drawing Sheets

BATTERY CELL HOUSING MADE OF AN ALUMINIUM ALLOY STRIP HAVING A HIGH RECYCLING CONTENT

CROSS-REFERENCE TO RELATED PATENT APPLICATIONS

This patent application is a continuation of International Application No. PCT/EP2022/077702, filed on Oct. 5, 2022, which claims the benefit of priority to European Patent Application No. 21201041.7, filed Oct. 5, 2021, the entire teachings and disclosures of both applications are incorporated herein by reference thereto.

FIELD OF THE DISCLOSURE

The invention relates to a battery cell housing having an aluminium alloy strip or sheet and to a use of an aluminium alloy strip or sheet for manufacturing a battery cell housing.

BACKGROUND OF THE INVENTION

Battery cells are used in a wide variety of technical applications to supply an electrical consumer with electrical energy. Application fields for battery cells are, for example, in electromobility, in particular in electric cars, electric bicycles and electric scooters, in consumer electronics, particularly in laptop computers, tablet computers, mobile phones, digital cameras and video cameras, or in energy technology, in particular in battery storage, to name just a few. Several battery cells are often connected together in series or parallel to form a battery module or a battery system. However, there are also applications in which individual battery cells are used as an energy source.

Battery cells can essentially be differentiated into primary cells, which can only be discharged once and cannot be recharged, and secondary cells, which are rechargeable. The necessary electrochemical processes that provide the functionality of the battery cell may be implemented with a wide variety of different materials in both primary and secondary cells. Examples of primary cells in this context are alkali-manganese cells, zinc-carbon cells, nickel-oxyhydroxide cells or lithium-iron sulphide cells, to name just a few. Examples of secondary cells are lithium-ion cells, sodium-ion cells, nickel-cadmium cells, nickel-metal hydride cells or nickel-zinc cells, to name just a few.

For a number of years, lithium-ion secondary cells have been increasingly used particularly in the fields of electromobility and consumer electronics, among other things because of their comparatively high gravimetric and volumetric energy density. Like other types of battery cells, lithium-ion secondary cells have a battery cell housing. This forms the outer shape of the battery cell and encloses a cavity, which contains among other things the anode material, the cathode material and an electrolyte. A distinction may be made between various designs of a battery cell housing: cylindrical battery cell housings essentially have the shape of a cylinder. If the height of the cylinder is greater than the diameter, they are referred to as round cells, otherwise as button cells. Battery cell housings of prismatic design essentially have the shape of a prism, in particular a cuboid. Another variant is the pouch design, in which the battery cell housing essentially has the shape of a pocket or pouch.

Owing to high requirements for strength and mechanical stability as well as high requirements for electrochemical stability in relation to the electrolyte acting corrosively on the battery cell housing, cylindrical battery cell housings in particular have to date generally been manufactured from nickel-plated steel. Increasing cell formats, however, such as the growing replacement of round cells of type 18650 with round cells of type 21700 and the expected future replacement of round cells of type 21700 with round cells of type 46800 in the field of electromobility, are placing higher requirements on the electrical and thermal conductivity since larger amounts of heat, which need to be dissipated, are generated. Potential aluminium materials must furthermore fulfil the high requirements for the strength of the housing material.

Approaches with the use of aluminium alloys for cylindrical battery cell housings are already known, but are limited to the aluminium alloy AA3003. The U.S. Pat. No. 6,258,480 B1 may be mentioned as an example of this. For prismatic battery cell housings, on the other hand, the aluminium alloy AA3003 is standard, although use in the field of prismatic cell housings is also limited to this alloy.

The United States patent US 2006/093908 A1 discloses a high-strength battery housing which consists of a composite material having an outer plastic layer and an aluminium foil made of an aluminium alloy of type AA8079, 1N30, AA8021, AA3003, AA3004, AA3104 or AA3105.

The same aluminium alloys are known from the Korean patent applications KR 2016 0056731 A, although the Korean patent application prefers the use of an aluminium alloy of type AA3003.

The Japanese patent application JP 2015 125886 A focuses on the strength and weldability of the battery housings and proposes the use of aluminium alloys of type AA3003, AA3203, AA3004, AA3104, AA3005 or AA3105.

None of the aforementioned documents addresses the problem of recyclability, taking into account the requirements for the strength, electrolyte stability and electrical and thermal conductivity of the battery cell housing.

However, the greatly increased sustainability requirements in recent years are requiring the production of battery cell housings with the smallest possible $CO_2$ footprint. The most effective way is to reduce the use of energy-intensive primary aluminium by the increased use of recycled material, also referred to as secondary aluminium. This is obtained by melting aluminium scrap. In the case of aluminium scrap, a distinction is made between pre-consumer scrap and post-consumer scrap. Pre-consumer scrap is waste which is generated during the manufacture of semi-finished products or end products made from aluminium or aluminium alloys in a wide variety of possible processes. Pre-consumer scrap may be further divided into internal process scrap on the one hand, which is unavoidably generated within the process of manufacturing aluminium strips or sheets, such as sprues, offcuts, swarf, production residues or production rejects, and external process scrap on the other hand, which is unavoidably generated in the further processing to form the end product, such as punching scrap, swarf or production rejects. Post-consumer scrap is an end product which has fully completed its life cycle and becomes waste after it has been used. It is irrelevant whether or not it was used by an end user, which means that it may also have been used in an industrial or commercial facility, for example. Examples of post-consumer scrap include food packaging, in particular beverage cans, window frames, lithographic printing plate carriers, cable cores and automotive components.

According to the international specification, the alloy composition of the aluminium alloy AA3003 hitherto used for battery cell housings is comparatively restrictive, for example with regard to the standard alloy elements copper, magnesium, chromium, zinc and titanium. Employing this alloy therefore requires the use of high proportions of primary aluminium and thus hinders the achievement of high recycling rates. Battery cell housings of the prior art made from the aluminium alloy AA3003 therefore need to be improved with regard to their sustainability.

SUMMARY OF THE INVENTION

Against this background, the object of the present invention is to provide a battery cell housing having an aluminium alloy strip or sheet, which makes it possible to achieve high recycling rates and at the same time satisfies the requirements of a battery cell housing, in particular with regard to strength, electrolyte stability and electrical and thermal conductivity.

A further object of the present invention is to provide a corresponding use of an aluminium alloy strip or sheet for manufacturing a battery cell housing.

According to a first teaching of the present invention, the aforementioned object is achieved for a battery cell housing having an aluminium alloy strip or sheet in that the aluminium alloy strip or sheet has an aluminium alloy with the following alloy constituents in wt %:

0.1%≤Si≤0.5%,
0.25%≤Fe≤0.8%,
Cu≤0.6%,
0.6%≤Mn≤1.4%,
0.5%≤Mg≤1.5%,
Cr≤0.25%,
Zn≤0.4%,
Ti≤0.2%,
the remainder being Al and unavoidable impurities, individually at most 0.05% and in total at most 0.15%.

Surprisingly, the inventor has found in tests that a battery cell housing according to the invention having an aluminium alloy strip or sheet fulfils the corresponding requirements, in particular with regard to strength, electrolyte stability and electrical and thermal conductivity. Above all, it has surprisingly been found that the electrolyte stability and weldability are not reduced, or are not reduced significantly, compared to the already known alloy AA3003. At the same time, the battery cell housing according to the invention is suitable for achieving high recycling rates because of the specified copper and magnesium contents of the aluminium alloy. This applies in particular to the use of UBC scrap (UBC: used beverage can), i.e. beverage cans made of aluminium alloys, which have significant contents of magnesium and copper and are suitable for manufacturing the aluminium alloy of the aluminium strip or sheet of the battery cell housing. All of the aforementioned advantages are achieved by the alloy composition of the aluminium alloy strip or sheet of the battery cell housing. Since the aluminium alloy furthermore contains only standard alloy elements, it can itself also be recycled well, so that the battery cell housing according to the invention may readily be added to existing scrap recycling operations.

According to the invention, the silicon content of the aluminium alloy is in the range 0.1 wt %≤Si≤0.5 wt %. In one embodiment of the battery cell housing according to the invention, the silicon content of the aluminium alloy is in the range 0.2 wt %≤Si≤0.4 wt %, preferably 0.2 wt %≤Si≤0.35 wt %. In combination with the iron and manganese contents according to the invention in the amounts specified, the silicon content of 0.1 wt %≤Si≤0.5 wt % leads in particular to relatively uniformly distributed, compact particles of the quaternary α-Al(Fe,Mn)Si phase. These precipitated particles increase both the strength of the aluminium alloy and its electrical and thermal conductivity, since they remove iron and manganese from the solid solution without detrimentally affecting other properties such as corrosion behaviour, i.e. electrolyte stability, or formability. Silicon contents of less than 0.1 wt % lead to reduced precipitation of α-Al(Fe,Mn)Si phases, which may impair the electrical and thermal conductivity because of dissolved manganese. Furthermore, the absence of α-Al(Fe,Mn)Si phases has a detrimental effect on tool wear. Silicon contents of more than 0.5 wt % may lead in combination with magnesium to the formation of $Mg_2Si$ phases, which detrimentally affects the solid solution hardening of magnesium. The corridor of the silicon content of the aforementioned embodiment of 0.2 wt %≤Si≤0.4 wt %, preferably 0.2 wt %≤Si≤0.35 wt %, represents an ideal compromise between high strength and high electrical and thermal conductivity.

According to the invention, the iron content of the aluminium alloy is in the range 0.25 wt %≤Fe≤0.8 wt %. In one embodiment of the battery cell housing according to the invention, the iron content of the aluminium alloy is in the range 0.3 wt %≤Fe≤0.7 wt %, preferably 0.4 wt %≤Fe≤0.7 wt %. The iron content of 0.25 wt %≤Fe≤0.8 wt % in combination with the manganese content according to the invention in the amount specified leads to the formation of $Al_6(Mn,Fe)$ phases, and, as already explained above, in combination with the silicon and manganese contents according to the invention in the amounts specified to the precipitation of particles of the quaternary α-Al(Fe,Mn)Si phase. Iron in this case contributes to lowering the solubility of manganese in aluminium, so that more manganese is bound in intermetallic phases, which has a positive effect on the electrical and thermal conductivity. In addition, the intermetallic phases influence recovery and recrystallisation processes and improve the thermal stability of the mechanical properties. Iron contents of more than 0.8 wt % promote the formation of coarse intermetallic phases, which may impair formability in the deep drawing process. Iron contents of less than 0.25 wt %, on the other hand, limit the tolerance of the aluminium alloy for ferrous scrap too greatly since conventional scrap grades generally have a significant proportion of iron. Limiting the iron content too greatly may therefore hinder the achievement of high recycling rates. The corridor of the iron content of the aforementioned embodiment of 0.3 wt %≤Fe≤0.7 wt %, preferably 0.4 wt %≤Fe≤0.7 wt %, therefore represents an ideal combination of recyclability, use of high proportions of recycled material, thermal stability, electrical and thermal conductivity and formability.

According to the invention, the copper content of the aluminium alloy is in the range Cu≤0.6 wt %. In one embodiment of the battery cell housing according to the invention, the copper content of the aluminium alloy is in the range Cu≤0.3 wt %, preferably 0.1 wt %≤Cu≤0.2 wt %. The fact that a copper content of up to 0.6 wt % is permitted results in an increased tolerance of the aluminium alloy for copper-containing aluminium alloy scrap, which promotes the achievement of high proportions of recycled material in the manufacture of the battery housing.

However, since excessively high copper contents may have a detrimental effect on the corrosion properties, the copper content is limited according to the invention to at most 0.6 wt % in order to achieve a sufficiently high electrolyte stability. For improved electrolyte stability and sufficiently high electrical and thermal conductivity, the copper content in the aforementioned embodiment is limited to 0.3 wt %. However, the presence of copper also causes an increase in the strength of the aluminium alloy by solid solution hardening, although this only becomes significant above a content of 0.1 wt %. A preferred range of 0.1 wt %≤Cu≤0.2 wt % therefore represents a compromise between high strength, sufficiently high electrical and thermal conductivity and further improved electrolyte stability with sufficient recycling tolerance.

According to the invention, the manganese content of the aluminium alloy is in the range 0.6 wt %≤Mn≤1.4 wt %. In one embodiment of the battery cell housing according to the invention, the manganese content of the aluminium alloy is in the range 0.8 wt %≤Mn≤1.1 wt %. As already explained above, the manganese content of 0.6 wt %≤Mn≤1.4 wt %, or 0.8 wt %≤Mn≤1.1 wt % in combination with the silicon and iron contents in the amounts specified leads to the precipitation of particles of the quaternary α-Al(Fe,Mn)Si phase as well as the $Al_6$(Mn,Fe) phase. The intermetallic phases hinder recovery and recrystallisation processes and therefore improve the thermal stability of the mechanical properties. Manganese contents of less than 0.8 wt % already reduce the increase in strength due to dispersoid and solid solution hardening. Manganese contents of less than 0.6 wt % lead to an insufficient increase in strength due to dispersoid and solid solution hardening, whereas manganese contents of more than 1.1 wt %, in particular more than 1.4 wt %, promote the formation of coarse intermetallic phases, which have an unfavourable effect on the forming properties in the deep drawing process. In addition, manganese contents of more than 1.1 wt %, in particular more than 1.4 wt %, reduce the electrical and thermal conductivity of the battery cell housing so greatly that the thermal management becomes inefficient.

According to the invention, the magnesium content of the aluminium alloy is in the range 0.5 wt %≤Mg≤1.5 wt %. In one embodiment of the battery cell housing according to the invention, the magnesium content of the aluminium alloy is in the range 0.8 wt %≤Mg≤1.5 wt %, preferably 0.8 wt %≤Mg≤1.2 wt %. The fact that a magnesium content of up to 1.5 wt % is permitted results in an increased tolerance of the aluminium alloy for magnesium-containing aluminium alloy scrap such as UBC scrap, which further promotes the achievement of high proportions of recycled material in the manufacture of the battery cell housings. In addition, the presence of magnesium above a content of at least 0.5 wt % leads to efficient solid solution hardening, which contributes to increased cold hardening and therefore increases the strength. However, since excessively high magnesium contents have a detrimental effect on the electrical and thermal conductivity, the magnesium content is limited according to the invention to at most 1.5 wt %. In order to achieve improved mechanical properties, the magnesium content in the aforementioned embodiment is increased to at least 0.8 wt %. The preferred range of 0.8%≤Mg≤1.2% represents a compromise between high strength, good forming behaviour and high electrical and thermal conductivity with good recycling tolerance.

According to the invention, the chromium content of the aluminium alloy is in the range Cr≤0.25 wt %. In one embodiment of the battery cell housing according to the invention, the chromium content of the aluminium alloy is in the range Cr≤0.1 wt %, preferably Cr≤0.05 wt %. The fact that a chromium content of up to 0.25 wt % is permitted results in an increased tolerance of the aluminium alloy for chromium-containing aluminium alloy scrap, which promotes the achievement of high proportions of recycled material in the manufacture of the battery cell housings. In addition, chromium also has a strength-increasing effect and forms dispersoids, which increase the thermal stability and hinder softening due to recrystallisation or recovery. However, since excessively high chromium contents may have a detrimental effect on the electrical conductivity of the aluminium alloy, the chromium content is limited according to the invention to at most 0.25 wt %. For improved conductivity with a recycling tolerance and strength that are still sufficient, the chromium content in the aforementioned embodiment is limited to 0.1 wt %, preferably 0.05 wt %.

According to the invention, the zinc content of the aluminium alloy is in the range Zn≤0.4 wt %. In one embodiment of the battery cell housing according to the invention, the zinc content of the aluminium alloy is in the range 0.02 wt %≤Zn≤0.25 wt %, preferably 0.04 wt %≤Zn≤0.25 wt %. The fact that a zinc content of up to 0.4 wt % is permitted results in an increased tolerance of the aluminium alloy for zinc-containing aluminium alloy scrap, which further promotes the achievement of high recycling rates. Zinc also has a strength-increasing effect. However, since excessively high zinc contents reduce the weldability, the electrical and thermal conductivity as well as the corrosion resistance of the aluminium alloy, the zinc content is limited according to the invention to at most 0.4 wt %. In the aforementioned embodiment, the zinc content is adjusted within the corridor 0.02 wt %≤Zn≤0.25 wt %, preferably 0.04 wt %≤Zn≤0.25 wt %, so that an optimal compromise between high strength, good weldability and good electrolyte stability is achieved with a recycling tolerance which remains good.

According to the invention, the titanium content of the aluminium alloy is in the range 0.005 wt.-% K Ti≤0.2 wt %. In one embodiment of the battery cell housing according to the invention, the titanium content of the aluminium alloy is in the range 0.005 wt % K Ti K 0.1 wt %, preferably 0.005 wt %≤Ti K 0.05 wt %. The fact that a titanium content of up to 0.2 wt % is permitted results in an increased tolerance of the aluminium alloy for titanium-containing aluminium alloy scrap, which promotes the achievement of high proportions of recycled material in the manufacture of battery cell housings. However, excessively high titanium contents may detrimentally affect the forming properties of the aluminium alloy and significantly reduce the electrical and thermal conductivity, so that the titanium content is limited according to the invention to at most 0.2 wt %. Conversely, titanium above a content of 0.005 wt % improves the grain refinement when casting the aluminium alloy. For good grain refinement together with good formability, sufficiently high electrical and thermal conductivity as well as sufficient recycling tolerance, the titanium content in the aforementioned embodiment is therefore adjusted within the corridor 0.005 wt %≤Ti≤0.1 wt %, preferably 0.005 wt %≤Ti≤0.05 wt %.

In addition to the alloy constituents mentioned above, the remainder of the aluminium alloy of the battery cell housing according to the invention consists of aluminium and unavoidable impurities. Unavoidable impurities are alloy constituents which are not intentionally added but are inevitably contained in the aluminium alloy due to manufacturing. According to the invention, the content of an individual unavoidable impurity is limited to 0.05 wt %, the content of all unavoidable impurities being limited in total to 0.15 wt %. This ensures that the unavoidable impurities have no detrimental effect, or no significant detrimental effects, on the properties of the aluminium alloy, for example by undesired phase formation.

In a further embodiment of the battery cell housing according to the invention, the aluminium alloy has a proportion of at least 50 wt %, preferably at least 70 wt %, of recycled material. Owing to the above-described high recycling tolerance of the aluminium alloy, it is possible to achieve high recycling rates of at least 50 wt %, preferably at least 70 wt %, for the battery cell housing according to the invention. The associated energy saving allows the production of battery cell housings with the smallest possible $CO_2$ footprint and improved sustainability. In particular, the aluminium alloy of the battery cell housing according to the invention has a proportion of post-consumer scrap of at least 50 wt %, preferably at least 70 wt %. Since the use of post-consumer scrap is particularly $CO_2$-efficient, a particularly large reduction of the $CO_2$ footprint may thereby be achieved. In addition or alternatively, the proportion of recycled material of at least 50%, preferably at least 70 wt %, is achieved by using pre-consumer scrap, in particular by using internal and/or external process scrap. With internal process scrap, the compositions and amounts of the individual alloys are generally very well known, so that the alloy composition resulting from the melting of internal process scrap can be determined well. External process scrap is less well defined in its composition than internal process scrap and may require further processing, but is generated to a large extent for example in the production of punched parts, so that recycling is of high relevance economically and in terms of sustainability. By recycling external process scrap, the need for primary metal can be reduced, which reduces the overall $CO_2$ balance.

In a further embodiment of the battery cell housing according to the invention, the aluminium alloy strip or sheet has a strain-hardened state of the type H1X. In particular, these are the states H12, H14, H16, H18 and H19 familiar to the person skilled in the art. Preferably, the aluminium alloy strip or sheet has the strain-hardened state H18 or H19. The aforementioned states, in particular H18 and H19, are characterised by particularly high mechanical stability, so that in particular high strengths may be provided for the battery cell housing.

In a further embodiment of the battery cell housing according to the invention, the aluminium alloy strip or sheet has a thickness of between 0.1 mm and 2.0 mm. With this thickness range, the typical wall thicknesses for a battery cell housing are essentially fully covered. Reducing the thickness to less than 0.1 mm decreases the mechanical stability of the battery cell housing too greatly. Conversely, efficient use of material is no longer possible with a thickness of more than 2.0 mm. In addition, the gravimetric and volumetric energy density of the battery cell or battery module, or battery system, would be reduced too greatly if the aluminium alloy strip or sheet of the battery cell housing were to have a thickness of more than 2.0 mm. Preferably, the thickness of the aluminium alloy strip or sheet is between 0.2 mm and 1.5 mm, in particular between 0.35 mm and 1.2 mm.

In a further embodiment of the battery cell housing according to the invention, the aluminium alloy strip or sheet has an electrical conductivity σ of at least 35% IACS. Compared to the hitherto used battery cell housings made of nickel-plated steel, the electrical conductivity is therefore increased significantly so that faster charging times, lower electrical losses and therefore also less development of heat during operation of the battery cells are achieved. Owing to the Wiedemann-Franz law, according to which there is a direct relationship between the electrical and thermal conductivity of a metal, increased electrical conductivity is furthermore associated with increased thermal conductivity compared to nickel-plated steel. This allows the waste heat generated during operation of the battery cells to be dissipated more efficiently. Furthermore, the higher thermal conductivity leads to a more homogeneous temperature distribution inside the cell, which has a positive effect on its ageing. The electrical conductivity σ of at least 35% IACS therefore leads overall to an improved performance of the battery cells.

In a further embodiment of the battery cell housing according to the invention, the aluminium alloy strip or sheet has a yield strength $R_{p0.2}$ of at least 180 MPa, preferably at least 220 MPa, in particular at least 250 MPa. This allows high strengths to be provided for the battery cell housing. Preferably, the aluminium alloy strip or sheet has the aforementioned values for the yield strength before its processing to form the battery cell housing, for example in the state H16, H18 or H19. Yet since the processing of the aluminium alloy strip or sheet, which is typically carried out by cold forming, for example deep drawing, is generally associated with an increase in strength, it may be assumed that the minimum values specified for the yield strength likewise apply to the battery cell housing according to the invention in the finished state.

In a further embodiment of the battery cell housing according to the invention, the aluminium alloy strip or sheet has a tensile strength $R_m$ of at least 190 MPa, preferably at least 230 MPa, in particular at least 260 MPa. This also makes it possible to provide high strengths for the battery cell housing. Once again, the aluminium alloy strip or sheet preferably already has the aforementioned values for the tensile strength before its processing to form the battery cell housing, for example in the state H16, H18 or H19, and it may also be assumed here that they likewise apply to the battery cell housing according to the invention in the finished state.

In a further embodiment of the battery cell housing according to the invention, the aluminium alloy strip or sheet has a yield strength $R_{p0.2}$ of at least 200 MPa at a temperature of 100° C. At the same time or alternatively, the aluminium alloy strip or sheet has a yield strength $R_{p0.2}$ of at least 150 MPa at a temperature of 200° C. Since in the event of a defect, an effect of damage or improper use, a battery cell becomes heated to a temperature which is sometimes significantly higher than room temperature, the aforementioned yield strengths at 100° C. or 200° C. may also provide high thermal stabilities for the battery cell housing. Once again, the aluminium alloy strip or sheet preferably already has the aforementioned values for the yield strength at 100° C. or 200° C., before its processing to form the battery cell housing, and it may also be assumed here that they likewise apply to the battery cell housing according to the invention in the finished state.

In a further embodiment of the battery cell housing according to the invention, the aluminium alloy strip or sheet has a wall thickness ratio δ of not more than 1.6, preferably not more than 1.4, with respect to steel before its processing to form the battery cell housing. The wall thickness ratio δ with respect to steel is determined by dividing the yield strength $R_{p0.2,St}$ of a nickel-plated steel strip of type AISI1020 by the yield strength $R_{p0.2,Al}$ of the aluminium alloy strip, a typical value of 350 MPa being set for $R_{p0.2,St}$. In order to derive the wall thickness ratio δ, the internal pressure loading scenario practically relevant for battery cell housings is considered. For simplification, the battery cell housing is assumed to be a closed and thin-walled cylinder. Based on this, the calculation of the wall thickness ratio δ with respect to steel is carried out by using the Barlow's formula known from elastostatics $\sigma_\varphi = p \cdot R_i / s$ with $\sigma_\varphi$: stress component in the circumferential direction, p: internal pressure, $R_i$: inner radius, s: wall thickness, and by using the comparative stress according to Tresca $\sigma_{V,Tresca}=\sigma_{max}-\sigma_{min}=\delta_\varphi-0=p\cdot R_i/s$ with a design against a load limited by the start of flow, i.e. $\sigma_{V,Tresca}\leq R_{p0.2}$. With an assumption of the same maximum internal pressure $p=R_{p0.2,Al}\cdot S_{Al}/R_{i,Al}=R_{p0.2,St}\cdot S_{St}/R_{i,St}$ and the assumption of the same internal radius $R_i$ of the cells, this gives $R_{p0.2,Al}\cdot S_{Al}=R_{p0.2,St}\cdot S_{Al}$, so that the wall thickness ratio $\delta$ may be calculated from the aforementioned yield strength ratio: $\delta=S_{Al}/S_{St}=R_{p0.2,St}/R_{p0.2,Al}$. The wall thickness ratio $\delta$ with respect to steel is a measure of the increase in the wall thickness of the battery cell housing when replacing steel with aluminium, and may in particular be used to compare different aluminium alloy strips or sheets with one another. The $\delta$ value according to the invention of not more than 1.6, preferably not more than 1.4, has a positive effect on the volumetric energy density of the battery cells, since the volume of space occupied by the aluminium alloy strip or sheet is thereby minimised with the same mechanical stability. Furthermore, limiting the wall thickness ratio in combination with the low density of aluminium compared to steel maximises gravimetric energy density.

In a further embodiment of the battery cell housing according to the invention, the aluminium alloy strip or sheet has an average percentage ear height Z of not more than 4%, preferably not more than 3%, and preferably a maximum percentage ear height $Z_{max}$ of not more than 6%, preferably not more than 5.5% before its processing to form the battery cell housing. The earing parameters Z and $Z_{max}$ are determined in the earing test according to DIN EN 1669 using a blank with a diameter of 60 mm, a punch diameter of 33 mm and the lubricant lanolin. The average percentage ear height Z of not more than 4%, preferably not more than 3%, and the preferably achieved maximum percentage ear height $Z_{max}$ of not more than 6%, preferably not more than 5.5%, mean that the aluminium alloy strip or sheet is highly suitable for deep drawing with minimal process scrap generation and thus for the efficient manufacture of a battery cell housing according to the invention.

According to a second teaching of the present invention, the aforementioned object is achieved for a use of an aluminium alloy strip or sheet for manufacturing a battery cell housing in that the aluminium alloy strip or sheet is used for manufacturing a battery cell housing according to the first teaching of the invention. Owing to the aforementioned advantageous properties of the aluminium alloy strip or sheet, a battery cell housing which is improved compared to the prior art may therefore be provided.

In one embodiment of the use according to the invention, the battery cell housing is a housing of a secondary cell, preferably a lithium-ion secondary cell or a sodium-ion secondary cell. Since secondary cells, in particular lithium-ion secondary cells, are currently being used increasingly in the fields of electromobility and consumer electronics, the advantageous properties of the aluminium alloy strip or sheet used according to the invention may be used in particular for this type of battery cell. This also applies to sodium-ion secondary cells, which are currently still predominantly the subject of research and might replace lithium-ion secondary cells in future in certain applications owing to better economy and the good availability of sodium. The use of the battery cell housing according to the invention furthermore comprises in particular the use of the housing for solid-state secondary cells that have a solid-state electrolyte.

In a further embodiment of the use according to the invention, the battery cell housing has a cylindrical design, a prismatic design or a pouch design. The advantageous properties of the aluminium alloy strip or sheet used according to the invention may therefore be employed in all currently conventional designs of a battery cell housing.

In a further embodiment of the use according to the invention, the aluminium alloy strip or sheet is manufactured by a method which comprises the following steps:
  casting a rolling ingot from an aluminium alloy,
  homogenising the rolling ingot,
  hot rolling the rolling ingot to form a hot-rolled strip,
  cold rolling the hot-rolled strip.

The aforementioned process steps are preferably carried out in the order specified, in which case the homogenisation of the rolling ingot may be carried out separately or may be integrated into the preheating of the rolling ingot for the hot rolling. It has been found that with the method described above, it is possible to manufacture an aluminium alloy strip or sheet with which the requirements of a battery cell housing, in particular with regard to strength, electrolyte stability and electrical and thermal conductivity, can be fulfilled when used according to the invention and at the same time high recycling rates can be achieved. Furthermore, this process allows economical manufacture of the aluminium alloy strip or sheet.

The casting of the rolling ingot from an aluminium alloy is preferably carried out in direct-chill continuous casting, also referred to as DC continuous casting, so that the economical viability of the manufacturing process may be further increased.

By homogenising the rolling ingot, an improvement of the microstructure of the aluminium alloy strip or sheet is achieved, which has a positive effect on strength and formability. Preferably, the homogenisation takes place at a temperature of from 480° C. to 620° C., in particular from 550° C. to 610° C., for a duration of at least 0.5 h, preferably at least 1 h, in particular at least 2 h.

The hot rolling of the rolling ingot to form a hot-rolled strip is preferably carried out at a temperature of between 280° C. and 550° C., the hot strip temperature after the last hot rolling pass being between 280° C. and 380° C., preferably between 310° C. and 360° C. The hot rolling of the rolling ingot may take place either in a reversing manner on one roll stand or sequentially in a tandem stand. In particular, the hot rolling may take place in a reversing manner as far as a slab thickness between 20 mm and 50 mm and the slab may then be rolled to hot strip thickness in a tandem stand. The hot strip thickness, i.e. the thickness of the hot-rolled strip, is in one embodiment of the method between 1 mm and 15 mm, preferably between 2 mm and 12 mm, in particular between 2 mm and 9 mm. This ensures that a sufficiently high rolling ratio, by which the strength and formability as well as the crystallographic texture and therefore the ear profile of the aluminium alloy strip or sheet are jointly determined, can be adjusted during the subsequent cold rolling.

The cold rolling of the aluminium alloy strip or sheet may be carried out in one or more passes. In an embodiment of the method in which several cold rolling passes are carried out, at least one intermediate anneal is optionally carried out during the cold rolling. In one embodiment of the method, the intermediate anneal takes place in the temperature range between 150° C. and 450° C., preferably between 200° C. and 400° C., in particular between 300° C. and 400° C. Preferably, the intermediate annealing is carried out as a recrystallisation anneal by which a recrystallised microstructure is provided for the subsequent cold rolling pass. This cold rolling pass may then be carried out with a higher rolling ratio, which has a strength-increasing effect on the finished rolled aluminium alloy strip or sheet. Alternatively, however, recovery annealing may also be carried out instead of recrystallisation annealing, which results in a hardening reduction.

In one embodiment of the method, the rolling ratio during the cold rolling at final thickness is at least 20%, preferably at least 50%, in particular at least 70%. If the method is carried out with intermediate annealing during the cold rolling, the rolling ratio in cold rolling at final thickness after the last intermediate anneal is at least 20%, preferably at least 50%, in particular at least 70%. Because of the rolling ratios during the cold rolling at final thickness of at least 20%, preferably at least 50%, in particular at least 70%, the strength of the manufactured aluminium alloy strip or sheet can be increased so that it is particularly suitable for the use according to the invention. Because of the high rolling ratios, earing occurs in a 45° position. Nevertheless, the earing may be compensated for by selecting the hot rolling parameters so that a recrystallised hot strip is produced, which then has earing in a 0°/90° position and can therefore compensate for the earing in the 45° position. The average percentage ear height Z and the maximum percentage ear height $Z_{max}$ may thereby be limited, which has a positive effect on the productivity in the deep drawing process and reduces the amount of scrap generated in the deep drawing process.

BRIEF DESCRIPTION OF THE DRAWINGS

The invention will be explained in more detail below with the aid of exemplary embodiments, reference also being made to the drawing. In the drawing.

DETAILED DESCRIPTION

Figure 1:
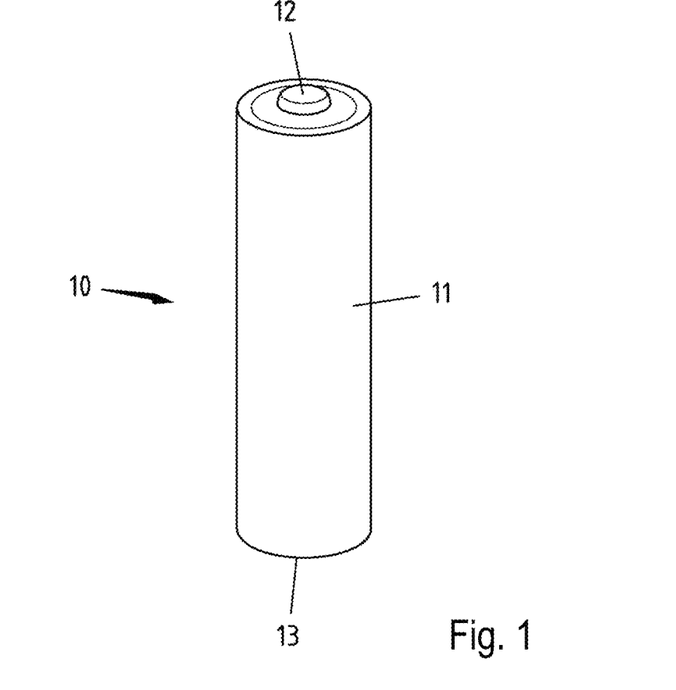
FIG. 1 shows a schematic representation of a battery cell of cylindrical design with a battery cell housing according to the invention.

FIG. 1 shows a battery cell 10 of cylindrical design in a schematic representation. The battery cell 10 comprises a battery cell housing 11 according to the invention and, adjacent thereto, an anode terminal 12 and a cathode terminal 13.

Figure 2:
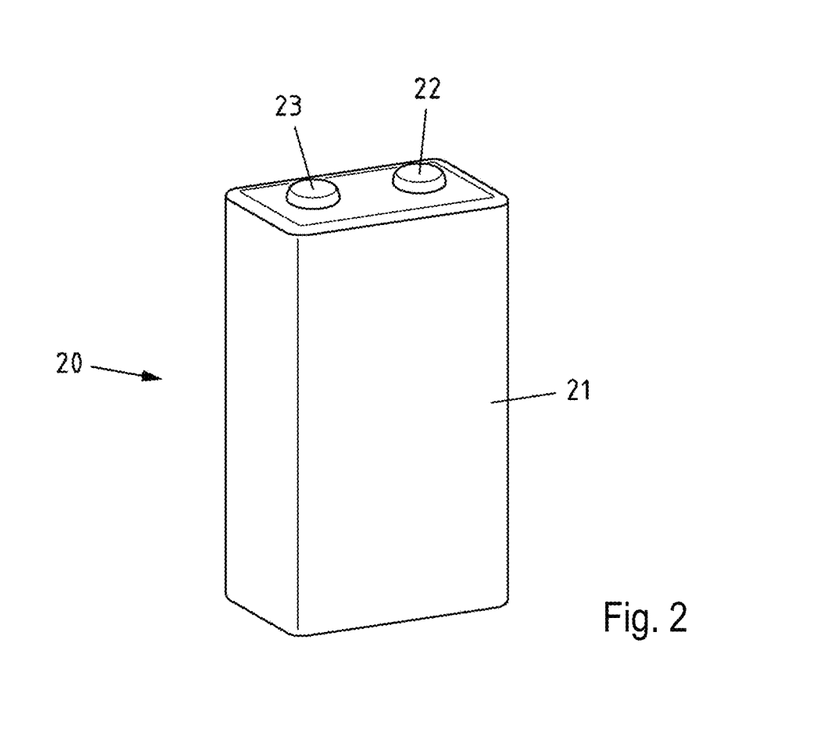
FIG. 2 shows a schematic representation of a battery cell of prismatic design with a battery cell housing according to the invention.

FIG. 2 shows a battery cell 20 of prismatic design in a schematic representation. The battery cell 20 comprises a battery cell housing 21 according to the invention and, adjacent thereto, an anode terminal 22 and a cathode terminal 23.

Figure 3:
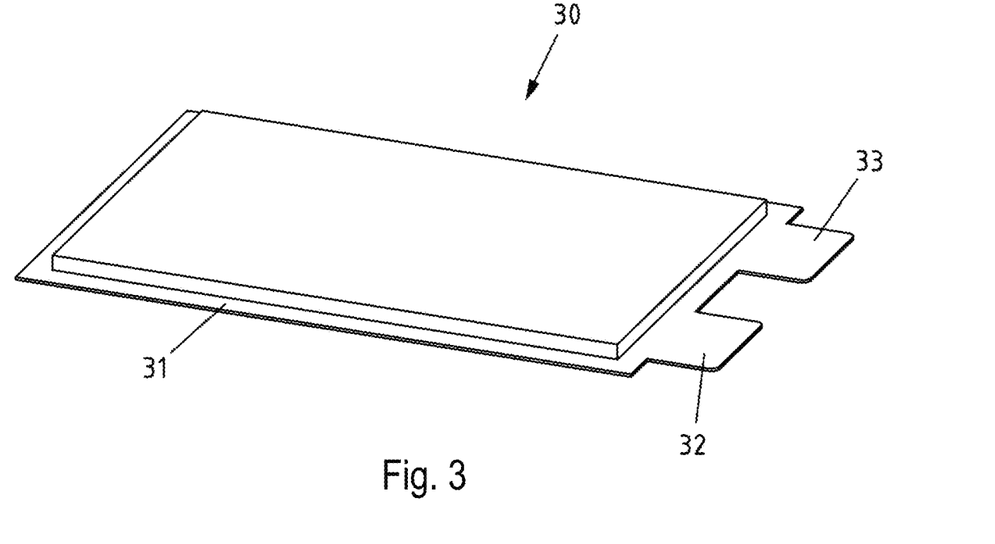
FIG. 3 shows a schematic representation of a battery cell in pouch design with a battery cell housing according to the invention.

FIG. 3 shows a battery cell 30 in pouch design in a schematic representation. The battery cell 30 comprises a battery cell housing 31 according to the invention and, adjacent thereto, an anode terminal 32 and a cathode terminal 33.

Figure 4:
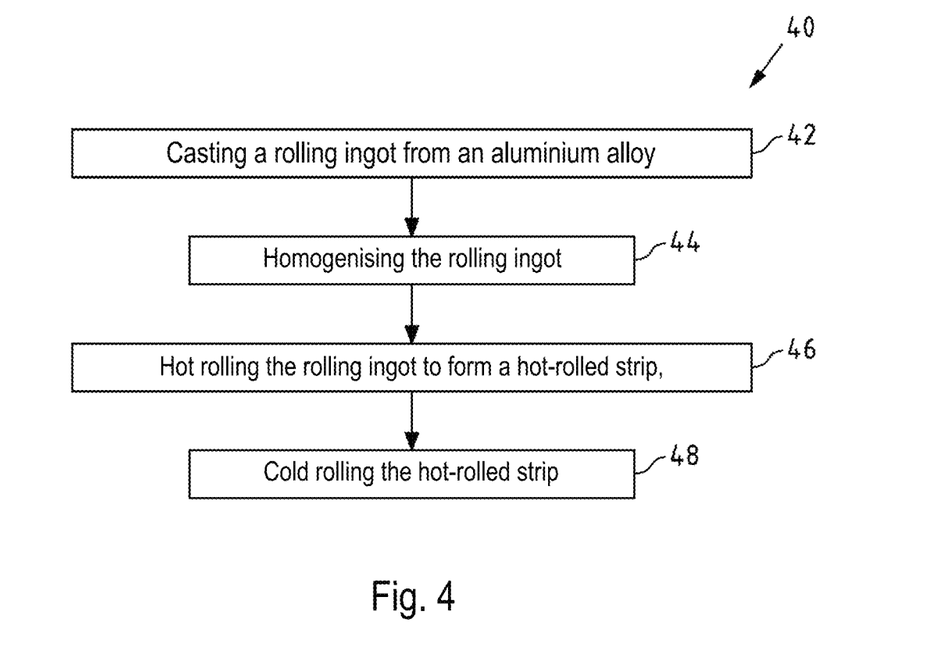
FIG. 4 shows a flowchart of a method for manufacturing an aluminium alloy strip or sheet for the use according to the invention.

FIG. 4 shows a flowchart of a method 40 for manufacturing an aluminium alloy strip or sheet for the use according to the invention. The method 40 comprises the following steps:
casting 42 a rolling ingot from an aluminium alloy,
homogenising 44 the rolling ingot,
hot rolling 46 the rolling ingot to form a hot-rolled strip,
cold rolling 48 the hot-rolled strip.

In the scope of the invention, a total of seven aluminium alloy strips, which are referred to below as strips 1 to 7, were manufactured from different aluminium alloys. The respective alloy compositions of strips 1 to 7 are summarised in Table 1 below. The contents of the individual alloy elements are specified in wt %. The remainder, i.e. the difference from 100 wt %, consists of aluminium and unavoidable impurities, individually at most 0.05 wt % and in total at most 0.15 wt %. Strips 1, 2, 3 and 7 are exemplary embodiments according to the invention with an alloy composition corresponding to the invention, this being identical for strip 1 and strip 2. Conversely, strips 4, 5 and 6 are comparative examples which have an aluminium alloy of type AA3003.

TABLE 1

| Strip | Si | Fe | Cu | Mn | Mg | Cr | Zn | Ti |
|---|---|---|---|---|---|---|---|---|
| 1 (inv.) | 0.25 | 0.59 | 0.18 | 0.84 | 1.03 | 0.01 | 0.04 | 0.02 |
| 2 (inv.) | 0.25 | 0.59 | 0.18 | 0.84 | 1.03 | 0.01 | 0.04 | 0.02 |
| 3 (inv.) | 0.23 | 0.59 | 0.18 | 0.82 | 1.03 | 0.01 | 0.04 | 0.03 |
| 4 (comp.) | 0.12 | 0.57 | 0.14 | 0.99 | 0.01 | <0.01 | 0.01 | 0.01 |
| 5 (comp.) | 0.20 | 0.53 | 0.14 | 1.05 | <0.01 | 0.01 | <0.01 | 0.02 |
| 6 (comp.) | 0.47 | 0.53 | 0.11 | 1.18 | <0.01 | <0.01 | <0.01 | 0.02 |
| 7 (inv.) | 0.14 | .30 | 0.52 | 1.18 | 0.63 | <0.01 | <0.01 | 0.02 |

The aluminium alloy strips 1 to 7 were tested with the method shown in FIG. 4. In detail, rolling ingots were cast from the respective aluminium alloys in DC continuous casting. A proportion of at least 70 wt % recycled material was selected for manufacturing the rolling ingots of strips 1, 2, 3 and 7 according to the invention. For comparative examples 4, 5 and 6, a maximum recycling rate of 30 wt % was achieved. The rolling ingots were homogenised after casting and then hot-rolled to form hot-rolled strips. The hot-rolled strips were then each strain-rolled to a final thickness of between 0.5 mm and 1.0 mm. The following Table 2 shows various method parameters for the manufacture of strips 1 to 7. In detail, these are the hot strip thickness, i.e. the respective thickness of the hot-rolled strip, the parameters temperature, duration and strip thickness of an optional intermediate anneal during the cold rolling, as well as the rolling ratio during the cold rolling at final thickness.

TABLE 2

| Strip | Hot strip thickness | Intermediate anneal | Rolling ratio during the cold rolling at final thickness |
|---|---|---|---|
| 1 (inv.) | 2.3 mm | — | 59% |
| 2 (inv.) | 2.3 mm | — | 59% |
| 3 (inv.) | 2.3 mm | — | 78% |
| 4 (comp.) | 4 mm | 360° C. for 2 h at 1.35 mm | 63% |
| 5 (comp.) | 7 mm | 400° C. for 2 h at 1.39 mm | 28% |
| 6 (comp.) | 7 mm | 400° C. for 2 h at 1.39 mm | 28% |
| 7 (inv.) | 7 mm | 400° C. for 2 h at 1.33 mm | 25% |

As may be seen from Table 2, strips 1 to 3 according to the invention were manufactured without intermediate annealing, whereas strip 7 according to the invention as well as comparative strips 4 to 6 were manufactured with an intermediate anneal, in particular with a recrystallisation anneal. In the case of strip 2, a final anneal was carried out after the cold rolling with a temperature of 250° C. and a holding time of 2 h.

The aluminium alloy strips were subsequently examined for various properties relevant to battery cell housings. The results of these tests are summarised in Table 3 below. In detail, Table 3 shows the material state, the thickness d as the final thickness after the cold rolling, the electrical conductivity σ, the yield strength $R_{p0.2}$, the tensile strength $R_m$, the wall thickness ratio δ in relation to steel, the average percentage ear height Z, as well as the maximum percentage ear height $Z_{max}$ of strips 1 to 7. Yield strength $R_{p0.2}$ and tensile strength $R_m$ were determined in the tensile test according to DIN EN ISO 6892-1. The wall thickness ratio δ with respect to steel was determined by dividing the yield strength $R_{p0.2,St}$ of 350 MPa, which is a typical value for a nickel-plated steel strip of type AISI1020, by the yield strength $R_{p0.2,Al}$ of the respective aluminium alloy strip 1 to 7. The average percentage ear height Z and the maximum percentage ear height $Z_{max}$ were determined in the earing test according to DIN EN 1669 using a blank with a diameter of 60 mm, a punch diameter of 33 mm and the lubricant lanolin.

In addition to the yield strength contained in Table 3, which refers to room temperature, the yield strength at 100° C. and the yield strength at 200° C. were also determined according to DIN EN ISO 6892-2 for strip 3 according to the invention as well as comparative strip 4. Strip 3 according to the invention reached a value of 270 MPa at 100° C. and a value of 161 MPa at 200° C. Comparative strip 4 reached a value of 151 MPa at 100° C. and a value of 92 MPa at 200° C. Since in the event of a defect, an effect of damage or improper use, a battery cell becomes heated to a temperature which is sometimes significantly higher than room temperature, strip 3 according to the invention is particularly suitable for use in the manufacture of a battery cell housing according to the invention because of its significantly higher thermal stability compared to comparative strip 4. Even though the aforementioned values of the yield strength at 100° C. and 200° C. apply for strip 3 before processing to form a battery cell housing, it may again be assumed that a battery cell housing manufactured from strip 3 has values that are at least equally high in the finished state.

As Table 3 further shows, strips 1, 3 and 7 according to the invention have a wall thickness ratio δ with respect to steel of not more than 1.6. In the case of a use according to the invention of the aforementioned strips for manufacturing a battery cell housing, this value has a positive effect on the volumetric as well as the gravimetric energy density of the finished battery cell, since the volume of space occupied by the aluminium alloy strip and the weight of the battery cell

TABLE 3

| Strip | State | d [mm] | σ [% IACS] | $R_{p0.2}$ [MPa] | $R_m$ [MPa] | δ | Z [%] | $Z_{max}$ [%] |
|---|---|---|---|---|---|---|---|---|
| 1 (inv.) | H18 | 0.95 | 41.2 | 230 | 265 | 1.52 | 2.2 | 5.3 |
| 2 (inv.) | H24 | 0.95 | 41.7 | 190 | 225 | 1.84 | 4.0 | 5.6 |
| 3 (inv.) | H19 | 0.5 | 38.6 | 274 | 302 | 1.27 | 2.3 | 4.7 |
| 4 (comp.) | H18 | 0.5 | 46.6 | 170 | 182 | 2.06 | 5.2 | 5.4 |
| 5 (comp.) | H14 | 1.0 | 49.1 | 157 | 168 | 2.22 | 3.6 | 3.9 |
| 6 (comp.) | H14 | 1.0 | 53.4 | 151 | 162 | 2.31 | 4.1 | 4.3 |
| 7 (inv.) | H14 | 1.0 | 43.6 | 225 | 239 | 1.55 | 6.8 | 7.2 |

As Table 3 shows, yield strengths and tensile strengths higher than those of comparative strips 4, 5 and 6 made of the aluminium alloy AA3003 can be achieved with strips 1, 2, 3 and 7 according to the invention. A strain-hardened state of type H1X, in particular the state H18 or H19, has a further positive effect on the strength, as shown by the comparison between strips 1, 2, 3 and 7 according to the invention. Thus, the yield strength and tensile strength of strip 2, which has an identical alloy composition to strip 1 (see Table 1) but is in the strain-hardened and annealed state H24, lie above comparative strips 3, 4 and 5 but below strip 1, which is in exclusively the strain-hardened state H18.

As Table 3 further shows, strips 1, 2, 3 and 7 according to the invention have a yield strength $R_{p0.2}$ of at least 180 MPa and a tensile strength $R_m$ of at least 190 MPa. They are therefore particularly suitable for use in the manufacture of a battery cell housing according to the invention. Even though the values of the yield strength and tensile strength shown in Table 3 apply for strips 1, 2, 3 and 7 before processing to form a battery cell housing, it may be assumed that a battery cell housing manufactured from strips 1, 2, 3 and 7 has values that are at least equally high in the finished state. This is due to the fact that the processing, which is typically carried out by cold forming, for example deep drawing, is generally accompanied by an increase in strength.

are thereby minimised with the same mechanical stability. Strips 1, 3 and 7 according to the invention are therefore particularly suitable for use in the manufacture of a battery cell housing according to the invention.

As Table 3 further shows, strips 1, 2 and 3 according to the invention have an average percentage ear height Z of not more than 4% and a maximum percentage ear height $Z_{max}$ of not more than 6%. Because of this, they are highly suitable for deep drawing and thus for manufacturing a battery cell housing according to the invention with minimal scrap generation. The values of Z and $Z_{max}$ are comparable to or slightly better than those of comparative strips 4, 5 and 6.

As Table 3 further shows, strips 1, 2, 3 and 7 according to the invention have an electrical conductivity σ of at least 35% IACS. Compared to the hitherto used battery cell housings made of nickel-plated steel, the electrical conductivity is therefore increased significantly so that faster charging times, lower electrical losses and therefore also less development of heat during operation of the battery cells may be achieved. Although the electrical conductivity σ of strips 1, 2, 3 and 7 according to the invention is slightly inferior to than that of comparative strips 4, 5 and 6, it nevertheless readily fulfils the requirements of battery cell housings. Owing to the Wiedemann-Franz law, according to which there is a direct relationship between electrical and thermal conductivity in metals, similar considerations also apply for the thermal conductivity. An improved thermal conductivity of the aluminium alloy strips according to the invention compared to nickel-plated steel allows significantly more efficient cooling of the battery cells, in particular at high C rates which occur during rapid charging, as well as a more homogeneous temperature distribution over the package, so that the ageing of the battery cell is limited.

As Table 3 further shows, strips 1, 2, 3 and 7 according to the invention have a thickness between 0.1 mm and 2.0 mm. A good compromise between mechanical stability and efficient use of materials is therefore achieved during use for manufacturing a battery cell housing according to the invention. In addition, the gravimetric and volumetric energy density of a corresponding battery cell or battery module or battery system is not reduced too greatly.

The corrosion behaviour of strip 3 according to the invention and of comparative strip 4 were evaluated out by means of cyclic polarisation measurement according to DIN 50918:2018-09 using a lithium hexafluorophosphate electrolyte. The resting potential of degreased strips in the electrolyte was first determined and the following polarisations were then carried out:
1. Polarisation of the resting potential at 1 mV/s by 600 mV in the cathodic direction,
2. Polarisation at 1 mV/s from the cathode region in the anodic direction up to the potential that corresponds to a corrosion current of 1 mA/cm$^2$,
3. Reverse polarisation at 1 mV/s back in the cathodic direction.

The evaluation of the measurements gave the parameters shown in Table 4 below for characterisation of the corrosion behaviour. In detail, Table 4 shows the cathodic current density, the exchange current density and the polarisation resistance. As the table shows, strip 3 according to the invention and comparative strip 4 have practically the same cathodic current densities, exchange current densities and polarisation resistances, so that strip 3 according to the invention fulfils the requirements for electrolyte stability in the same way as reference strip 4, which has an alloy-state combination typical of prismatic battery cell housings of the prior art.

TABLE 4

| Strip | Cathodic current density at −800 mV [mA/cm$^2$] | Exchange current density [mA/cm$^2$] | Polarisation resistance [kΩ] |
| --- | --- | --- | --- |
| 3 | 138 | 5 | 94 |
| 4 | 148 | 6 | 89 |

Since the electrolyte stability is essentially determined by the chemical composition, which is very similar for strips 1, 2, 3 and 7 according to the invention on the one hand and comparative strips 4, 5 and 6 on the other hand, the cyclic polarisation measurements according to DIN 50918:2018-09 demonstrate overall that the electrolyte stability for strips 1, 2, 3 and 7 according to the invention is essentially the same as those of comparative strips 4, 5 and 6 made of the aluminium alloy AA3003. The strips according to the invention therefore likewise meet the requirements for electrolyte stability and are therefore suitable for use in the manufacture of a battery cell housing according to the invention.

Owing to the advantageous properties of strips 1, 2, 3 and 7 according to the invention, in particular strips 1 and 3, which have just been described in detail, they are particularly suitable for the use according to the invention for manufacturing a battery cell housing. In this way, it is possible to manufacture battery cell housings according to the invention which are represented by way of example in FIGS. 1 to 3.

The battery cells (10, 20, 30) shown in FIGS. 1 to 3 may be secondary cells, in particular lithium-ion secondary cells or sodium-ion secondary cells, so that the battery cell housings (11, 21, 31) according to the invention are respectively housings of a secondary cell, in particular a lithium-ion secondary cell or a sodium-ion secondary cell. The advantageous properties of the aluminium alloy strips used according to the invention may therefore be employed in particular for these types of battery cells.

Furthermore, the battery cell housings (11, 21, 31) according to the invention shown in FIGS. 1 to 3 may in particular have a cylindrical design, a prismatic design or a pouch design. FIG. 1 shows a battery cell housing (11) according to the invention in cylindrical design; FIG. 2 shows a battery cell housing (21) according to the invention in prismatic design, and FIG. 3 shows a battery cell housing (31) according to the invention in pouch design. The advantageous properties of the aluminium alloy strips used according to the invention may therefore be used in all currently typical designs of a battery cell housing.

Furthermore, the aluminium alloys on which the battery cell housings (11, 21, 31) according to the invention, shown in FIGS. 1 to 3, are based preferably have a proportion of at least 50 wt %, preferably at least 70 wt %, of recycled material. The recycling rate is preferably achieved by using post-consumer scrap. The associated energy saving allows the production of battery cell housings with the smallest possible $CO_2$ footprint and increases the sustainability of the battery cell housings. This is possible because the battery cell housings (11, 21, 31) according to the invention are highly suitable achieving high recycling rates because of their alloy composition. In addition or alternatively, the recycling rate may also be achieved by using internal or external process scrap and also a reduction of the $CO_2$ footprint may likewise be achieved compared to a primary aluminium-based production.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Battery cell housing having an aluminium alloy strip or sheet,
wherein,
the aluminium alloy strip or sheet has an aluminium alloy with the following alloy constituents in wt %:
0.1%≤Si≤0.5%,
0.25%≤Fe≤0.8%,
Cu≤0.6%,
0.6%≤Mn≤1.4%,
0.5%≤Mg≤1.5%,
Cr≤0.25%,
Zn≤0.4%,
0.005%≤Ti≤0.2%,
the remainder being Al and unavoidable impurities, individually at most 0.05% and in total at most 0.15%.

2. Battery cell housing according to claim 1,
wherein,
the aluminium alloy strip or sheet has an aluminium alloy with the following alloy constituents in wt %:
0.2%≤Si≤0.4%, preferably 0.2%≤Si≤0.35%,
0.3%≤Fe≤0.7%, preferably 0.4%≤Fe≤0.7%,
Cu≤0.3%, preferably 0.1%≤Cu≤0.2%,
0.8%≤Mn≤1.1%,
0.8%≤Mg≤1.5%, preferably 0.8%≤Mg≤1.2%,
Cr≤0.1%, preferably Cr≤0.05%,
0.02%≤Zn≤0.25%, preferably 0.04%≤Zn≤0.25%,
0.005%≤Ti≤0.1%, preferably 0.005%≤Ti≤0.05%,
the remainder being Al and unavoidable impurities, individually at most 0.05% and in total at most 0.15%.

3. Battery cell housing according to claim 1,
wherein,
the aluminium alloy has a proportion of at least 50 wt %, preferably at least 70 wt %, of recycled material.

4. Battery cell housing according to claim 1,
wherein,
the aluminium alloy strip or sheet has a strain-hardened state of the type HIX, preferably the strain-hardened state H18 or H19.

5. Battery cell housing according to claim 1,
wherein,
the aluminium alloy strip or sheet has a thickness between 0.1 mm and 2.0 mm, preferably between 0.2 mm and 1.5 mm, particularly preferably between 0.35 mm and 1.2 mm.

6. Battery cell housing according to claim 1,
wherein,
the aluminium alloy strip or sheet has an electrical conductivity σ of at least 35% IACS.

7. Battery cell housing according to claim 1,
wherein,
the aluminium alloy strip or sheet, preferably before its processing to form the battery cell housing, has a yield strength $R_{p0.2}$ measured according to DIN EN ISO 6892-1 of at least 180 MPa, preferably at least 220 MPa, particularly preferably at least 250 MPa.

8. Battery cell housing according to claim 1,
wherein,
the aluminium alloy strip or sheet has a yield strength $R_{p0.2}$ measured according to DIN EN ISO 6892-1 of at least 200 MPa at a temperature of 100° C. and/or a yield strength $R_{p0.2}$ of at least 150 MPa at a temperature of 200° C.

9. Battery cell housing according to claim 1,
wherein,
the aluminium alloy strip or sheet, before its processing to form the battery cell housing, has a wall thickness ratio δ of not more than 1.6, preferably not more than 1.4, with respect to steel.

10. Battery cell housing according to claim 1,
wherein,
the aluminium alloy strip or sheet, before its processing to form the battery cell housing, has an average percentage ear height Z of not more than 4%, preferably not more than 3%, and preferably a maximum percentage ear height $Z_{max}$ of not more than 6%, preferably not more than 5.5%, in the earing test according to DIN EN 1669.

11. Use of an aluminium alloy strip or sheet for manufacturing a battery cell housing according to claim 1.

12. Use according to claim 11,
wherein,
the battery cell housing is a housing of a secondary cell, preferably a lithium-ion secondary cell, a sodium-ion secondary cell or a solid-state secondary cell.

13. Use according to claim 11,
wherein,
the battery cell housing has a cylindrical design, a prismatic design or a pouch design.

14. Use according to claim 11,
wherein,
the aluminium alloy strip or sheet is manufactured by a method which comprises the following steps:
casting rolling ingot from an aluminium alloy,
homogenising the rolling ingot,
hot rolling rolling the rolling ingot to form a hot-rolled strip,
cold rolling the hot-rolled strip.

15. Use according to claim 14,
wherein,
the thickness of the hot-rolled strip is between 1 mm and 15 mm, preferably between 2 mm and 12 mm, particularly preferably between 2 mm and 9 mm.

16. Use according to claim 14,
wherein,
at least one intermediate anneal takes place during the cold rolling.

17. Use according to claim 14,
wherein,
the rolling ratio during the cold rolling at final thickness, preferably the rolling ratio after the last intermediate anneal, is at least 20%, preferably at least 50%, particularly preferably at least 70%.

* * * * *

UNITED STATES PATENT AND TRADEMARK OFFICE
CERTIFICATE OF CORRECTION

Page 1 of 1

PATENT NO. : 12,180,566 B2
APPLICATION NO. : 18/621524
DATED : December 31, 2024
INVENTOR(S) : Martin Christoph Lentz et al.

It is certified that error appears in the above-identified patent and that said Letters Patent is hereby corrected as shown below:

On the Title Page

Item (65) reads:
"Prior Publication Data
US 2024/0240290 A1 Jul. 18, 2024"

Should read:
--Prior Publication Data
US 2024/0240290 A1 Jul. 18, 2024
US 2024/0425952 A2 Dec. 26, 2024--

Signed and Sealed this
Eleventh Day of February, 2025

Coke Morgan Stewart
*Acting Director of the United States Patent and Trademark Office*